United States Patent [19]
McCullough, Jr.

[11] Patent Number: 6,022,946
[45] Date of Patent: Feb. 8, 2000

[54] PROCESS FOR DEACTIVATION OF POLYOLEFIN COMPOSITIONS UTILIZING CARBON DIOXIDE AS A DEACTIVATION AGENT

[75] Inventor: James Douglas McCullough, Jr., Houston, Tex.

[73] Assignee: Union Carbide Chemicals & Plastics Technology Corporation, Danbury, Conn.

[21] Appl. No.: 09/220,180

[22] Filed: Dec. 23, 1998

[51] Int. Cl.$^7$ ........................................................ C08F 6/00
[52] U.S. Cl. ........................ 528/480; 528/483; 526/348.2; 526/352
[58] Field of Search ...................... 528/480, 483; 526/348.2, 352

[56] References Cited

U.S. PATENT DOCUMENTS

| | | | |
|---|---|---|---|
| 4,211,863 | 7/1980 | McDaniel et al. | 528/483 |
| 4,314,053 | 2/1982 | Lin et al. | 528/483 |
| 4,731,438 | 3/1988 | Bernier | 528/483 |
| 4,758,654 | 7/1988 | Brod et al. | 528/483 |
| 4,803,259 | 2/1989 | Zboril et al. | 528/483 |
| 5,344,885 | 9/1994 | Kersting et al. | 525/245 |
| 5,371,053 | 12/1994 | Agapiou et al. | 502/56 |
| 5,447,622 | 9/1995 | Kerby et al. | 585/312 |
| 5,756,659 | 5/1998 | Hughes et al. | 528/501 |

FOREIGN PATENT DOCUMENTS

| | | |
|---|---|---|
| 08294491A2 | 3/1998 | European Pat. Off. . |
| 59219396 | 5/1986 | Japan . |
| 61-176611 | 8/1986 | Japan . |
| 98/52978 | 11/1998 | WIPO . |

*Primary Examiner*—Terressa Mosley-Boykin
*Attorney, Agent, or Firm*—P. A. Doody; P. W. Leuzzi

[57] ABSTRACT

A method of deactivating a polyolefin polymer is disclosed whereby the polymer is contacted in a post-reactor vessel with $CO_2$ and then an acid acceptor and at least one secondary antioxidant are incorporated into the deactivated polyolefin polymer. The resulting product displays improved color and reduced melt flow breaking tendency, and does not exhibit polymer agglomeration and stickiness.

6 Claims, No Drawings

PROCESS FOR DEACTIVATION OF POLYOLEFIN COMPOSITIONS UTILIZING CARBON DIOXIDE AS A DEACTIVATION AGENT

BACKGROUND OF THE INVENTION

1. Field of the Invention

The present invention relates to a process for deactivating catalyst residues within polyolefin polymer particles in a post-reactor vessel by contacting the polymer particles with carbon dioxide ($CO_2$) followed by melt extrusion or other means of incorporating an acid acceptor and at least one secondary antioxidant. The secondary antioxidant preferably is selected from organic phosphites, organic phosphonites, aromatic lactones or N,N-dialkylhydroxylamines and related species. The resulting product displays improved color and reduced melt flow breaking tendency.

2. Description of Related Art

Catalyst deactivation has been a pivotal part of polypropylene technology since its inception. Product discoloration and melt flow instability were hallmarks of inadequate deactivation, particularly with the old conventional Ziegler-Natta catalysts where product titanium levels where generally high. Indeed, an extraction step was often needed to reduce catalyst levels. With the advent of super high activity catalysts exemplified by U.S. Pat. Nos. 4,728,705, 5,034,361; 5,082,907; 5,151,399; 5,229,342; 5,106,806; 5,146,028; 5,066,737; and 5,077,357, levels of titanium in the product became so low that deactivation became a more manageable process, and the focus was as much on the elimination of reactive alkyl species as it was on the deactivation of titanium.

Many ways to deactivate polypropylene in association with product finishing have been envisioned over the years in association with a variety of patents relating to the use of alcohols, water based systems, and other approaches. Mention is made of some of these technologies in "Polypropylene and other Polyolefins", authored by Ser van der Ven (Elsevier, Amsterdam, p. 121(1990)). Deactivation with water or steam has advantages because of the high reactivity of water with the aluminum alkyls and with other catalyst related species as well. Further, it offers convenience and economy of use. However, the water may hydrate residual magnesium chloride within the powder to make the hexahydrate which later at melt compounding temperatures undergoes internal hydrolysis, releasing HCl. The thermal decomposition of the hexahydrate has been described by Petzold and Naumann (J. THERMAL ANALYSIS, 19, 25 (1980)); by. Dutt, et al (Indian J. Technol., 10, 41 (1972)); and by Heide and Eichhorn (J. THERMAL ANALYSIS, 7, 397 (1975)). In addition, with high rubber content impact copolymers, steam treatment by virtue of heat and moisture can make the rubber phase more cohesive, and thus potentially limits the upper rubber content (Fc) limit. An association between greater ease of emptying a product purging vessel with shutting off the steam treatment has been observed in connection with commercial unit production of impact polypropylene with a high Fc level. Reference to handling problems caused by excessive moisture in olefin polymers during the deactivation process can be found in Brod and Garner, U.S. Pat. No. 4,758,654.

In application to other polyolefins in general, steam may have the same adverse effects leading to particle agglomeration, particularly when inherent crystallinity is compromised by the presence of a comonomer phase. Further, it is advantageous to introduce steam near the discharge orifice from the deactivation vessel, with the steam directed upward as described by Bernier, U.S. Pat. No. 4,731,438. While this is desirable for reasons cited by Bernier and not an issue with relatively crystalline polyolefins, having hot steam in the vicinity of the discharge orifice creates a potential for particle agglomeration in that critical area when high comonomer content polyolefin polymers are manufactured. As is well known in the art, particle agglomeration can lead to bridging and ultimately plugging of the vessel orifice.

It is known that $CO_2$ will react with aluminum alkyls to form carboxylated aluminum species as has been described by Sonntag and Zilch ("Synthetic Fatty Acids", in FATTY ACIDS AND THEIR INDUSTRIAL APPLICATIONS, Edited by E. S. Pattison, Marcel Dekker, NY, p. 365 (1968)). Mirviss and Inchalik, U.S. Pat. No. 2,827,458, disclose this reaction as a step in an approach to making carboxylic acids having an odd number of carbon atoms. Temperature and pressure play an important role in the reaction, however, and the use of gas-solid media has not been explored in prior art references. While the authors of the latter reference show three moles of $CO_2$ reacting with one mole of aluminum trialkyl species, other work by Ziegler, et al (Liebigs Ann. Chem., 629, 251 (1960)) suggests that it is more likely that one or at most two moles of $CO_2$ are incorporated. The latter was accomplished at high pressures (about 150 to 180 atm) and temperatures (220° C. to 240° C.).

Ishimoto et al (Patent Bureau of Japan, Official Gazette for Unexamined Patents, Disclosure No. S61-98707, May 17, 1986; Application No. S59-219396, Oct. 20, 1984) disclose the use of $CO_2$ as a catalyst deactivator in slurry polymerization in an application concerning the use of "catalyst inactivators" selected from a group of oxygen containing compounds such as "CO, $CO_2$, water alcohol, ether and ketone". The application is directed to the slurry polymerization ($TiCl_4$ with TEAL, etc.) of ethylene or propylene copolymers with 1-olefins of at least 5 carbon atoms, and the inactivator is specifically intended for eliminating unreacted comonomer (C5 or larger) from undergoing post-reactor polymerization in a flash drum. When this type of polymerization occurs, the result is fish-eyes in the product. The $CO_2$ treatment takes place during removal of monomers from the solvent-polymer slurry. This provides no added benefit, however, with respect to avoidance of polymer stickiness and associated agglomeration since a liquid medium is maintained during the treatment step. JP 61176611 A2, Aug. 8, 1986; DuPont Canada (Priority: GB 85-2067, Jan. 28, 1985), disclose the high temperature solution polymerization of ethylene or a mixture containing C4 to C12 olefins. Titanium or vanadium catalysts were used with DEAC. Deactivators included $CO_2$ and CO among other species. The process is described as providing discoloration resistant polymer without removing residual catalysts. In an example, $CO_2$ is used along with a cyclohexane solution of caprylic acid-calcium caprylate. Good color was obtained.

In slurry or solution polymerization, catalyst deactivation with $CO_2$ offers no process advantage that can be attributed to a gas phase process, especially with respect to copolymers containing a rubber phase. In the presence of solvent or the typical hydrocarbon diluent, rubber phases from polypropylene impact copolymers and polyolefins with high comonomer content either dissolve or partially extract, leaving sticky coatings on the ultimately isolated polymer particles, thus eliminating any advantage $CO_2$ might have offered in regard to reducing a tendency for particle agglomerations.

In other disclosures, Ohtani, et al., EP No. 829,491 A2, describe the use of agents (one of which is $CO_2$) to quickly terminate gas phase olefin polymerizations through direct contacting of the agent and the reaction medium in the reactor. The purpose is to permit use of the reactor granules as seed powder for subsequent polymerization without treatment to remove the deactivator. In a similar mode, Kersting, et al., U.S. Pat. No. 5,344,885 teach mechanisms to deactivate a pre-activated Ziegler-Natta catalyst and then reactivate the catalyst before polymerization. Further, Kersting, et al. report that this improves reactor product morphology in terms of fewer fines and fewer coarse particles. In addition, WO 98/30599 disclose temporarily idling a polymerization reaction by injecting a sufficient amount of a kill gas that may include $CO_2$, and then subsequently restarting the polymerization reaction by adding additional catalyst. Because the kill gas is introduced into the reaction zone, catalyst activity and thus production efficiency is compromised, and vent gases must be removed from the reactor. Thus the method would not be effective or efficient for deactivating catalyst residue during continuous production in the gas phase reactor.

Alcohols and carboxylate species are known to inhibit, rather than promote Ziegler-Natta polymerization as has been disclosed by van der Ven as referenced above. According to Ziegler, et al in their above cited reference, the autooxidation of alkyl aluminum compounds with subsequent hydrolysis proceeds as follows:

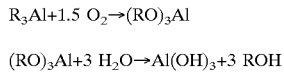

$$R_3Al + 1.5\ O_2 \rightarrow (RO)_3Al$$

$$(RO)_3Al + 3\ H_2O \rightarrow Al(OH)_3 + 3\ ROH$$

The alkoxide is formed via the intermediacy of peroxidic species, as is known in the art (cf A. G. Davies and C. D. Hall, J. Chem. Soc., 1192 (1963)). While most of the peroxidic material is converted to alkoxide, some may remain (Davies and Hall) to later cause discoloration through reaction to produce chromophores.

When water or steam is used as the deactivator, the pertinent reaction with aluminum alkyls is well known in the art, and is given as follows:

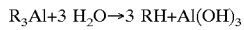

$$R_3Al + 3\ H_2O \rightarrow 3\ RH + Al(OH)_3$$

As mentioned above, Bernier, U.S. Pat. No. 4,731,438, and Brod and Garner, U.S. Pat. No. 4,758,654, disclose technologies associated with catalyst deactivation with aqueous media. In accordance with the above reaction of aluminum alkyls with water or steam, volatile alkenes may be produced in a quantity that can be substantial with commercial unit production over time. Production of volatile alkenes can be extremely hazardous, especially in subsequent high temperature material handling or processing steps downstream from the reactor environment.

It has not been known previously to deactivate catalyst residue using $CO_2$ within an extruder. Hughes, et al., U.S. Pat. No. 5,756,659, describe means to improve the oxidative thermal stability of ethylene polymers by removing residual unreacted monomer, solvent and thermally unstable species using inert stripping agents, including $CO_2$, water and steam, introduced into at least one stripping agent port. Removal of volatile species is effected in at least one vacuum zone downstream from the point or points of stripping agent introduction. Hughes, et al. is not concerned with catalyst residue deactivation, and does not suggest the use of $CO_2$ as an active species that can react with unreacted catalyst residue present in a polymer product.

SUMMARY OF THE INVENTION

Thus, there exists a need to develop a process that is capable of deactivating catalytic residue present in solid polymer particles produced in a gas phase reactor, whereby the process avoids polymer particle stickiness and agglomeration. There also exists a need to develop a process for catalytic residue deactivation that does not produce volatile organics or highly reactive and potentially peroxidizeable aluminum alkyls. In addition, there exists a need to develop a process for deactivating catalyst residue in polymer particles that does not cause production of peroxides, and that does not subsequently discolor the polymer. Accordingly, it is an object of the present invention to provide a method of deactivating catalyst residue that satisfies one or more of the above-mentioned needs.

In accordance with this objective, and other objectives that will be readily apparent to those skilled in the art upon reading this disclosure, there is provided a process of deactivating catalyst residues within polyolefin product particles in a post-reactor vessel, tank, bin, or dry mixer through contacting with carbon dioxide ($CO_2$), followed by melt extrusion or otherwise melt processing with an acid acceptor and at least one secondary antioxidant. It is preferred that the secondary antioxidant is selected from stabilizers such as organic phosphites, organic phosphonites, aromatic lactones or N,N-dialkylhydroxylamines, and related species including precursors, derivatives and thermal, oxidative or hydrolytic breakdown products thereof.

In accordance with an additional object of the invention, when the polymer product has pellet shapes by virtue of the original catalyst morphology, and has not been subjected to prior melt processing, the product may similarly be treated with $CO_2$ to effect partial deactivation. In this embodiment, the pellet shaped particles would incorporate the above essential additives by coating or entrainment or other means known in the art.

The resulting polymer product of the present invention displays improved color and reduced melt flow breaking tendency. By virtue of an inherently dry environment during $CO_2$ treatment, plugging of orifices and sticking of fines and other particulates to vessel walls is avoided. Further, the amounts of volatile olefins such as ethylene released upon reaction of aluminum alkyls with conventional water or steam treatment are significantly reduced through the reaction with $CO_2$.

In accordance with an additional object of the present invention, there is provided a method of deactivating catalyst residues within polyolefin product particles comprising first contacting the polyolefin product particles in a post-reactor vessel, tank, bin or dry mixer through contacting with carbon dioxide ($CO_2$), and then optionally with inert carrier gas. The deactivated polyolefin product particles then can be subjected to melt extrusion or otherwise melt processing with an acid acceptor and at least one secondary antioxidant.

DETAILED DESCRIPTION OF PREFERRED EMBODIMENTS

Finished product deactivation typically is conducted post-reactor and near the end of a process train in a vessel, bin or chamber within which the primary function is deactivation. The vessel, however, may also function in the purging of unreacted monomer and other volatiles from the polymer. In accord with the present invention, deactivation may also be conducted within an extruder or other melt processing device. In this mode the stickiness problem as described above does not exist, and advantage may be made of both $CO_2$ and water or steam in the dual roles of deactivation and the removal of volatiles.

In the process of this invention, neither $CO_2$ nor water are inert. More specifically in regard to $CO_2$, it is believed that highly reactive and potentially peroxidizeable aluminum alkyls are transformed to less reactive species, and it is plausible that other catalyst residues are similarly ameliorated, although as a general consideration the complexity of the chemistry of deactivation defies attempts to unravel all the specific reaction pathways. The process of the instant invention also provides a mechanism to remove $CO_2$ from the environment through conversion to non-greenhouse gas materials. Recycling of any unreacted $CO_2$ can be carried out through technology known in the art. Those skilled in the art are capable of removing unreacted $CO_2$ from the system and recycling it to the deactivation vessel using the guidelines provided herein.

As mentioned above, it is known that oxidation of aluminum alkyls can result in the formation of reactive peroxides that may participate in undesirable reactions with polymer or additive species, leading to molecular scission and discoloration. Using the carboxyl moiety attached to aluminum as in the inventive process, however, it is believed that the formation of peroxides is hindered. In addition, the process of the present invention reduces discoloration traditionally associated with treatment with dry nitrogen followed by exposure to air relative to the beneficial treatment with $CO_2$ followed by exposure to air. Note that in typical commercial extrusion processes, low but measurable levels of oxygen, say up to 2,000 ppm, generally exist even in the presence of inerting in the vicinity of the extruder feed throat, but full inerting is desirably accomplished in purging and deactivation vessels, although the essence of the invention is retained if very minor amounts of oxygen, typically a few ppm but less than 100 ppm, exist where purging and deactivation take place. As an additional benefit, reaction with $CO_2$ also reduces the production of volatile alkene, a quantity that can be substantial with commercial unit production over time.

The process of the present invention preferably results in permanent and irreversible deactivation. This can be effected in a vessel downstream from the reactor by treatment of product granules containing active catalyst components (Ziegler-Natta, metallocene, etc.) with $CO_2$, and then contacting them with either oxygen (including air contacting), or with selected stabilizer components in an extruder followed by air contacting upon exiting the extruder. As has been stated above, one or at most two alkyl groups on aluminum generally are replaced by carboxylate groups formed upon insertion of $CO_2$ at the point of linkage between aluminum and alkyl moieties. It is within the realm of possibility that up to three alkyl groups may be replaced if reaction with $CO_2$ extends to the extruder. However, performance in accord with the invention is satisfied with partial replacement due to the resulting inactivation of the remaining alkyl moieties. In the case of partial replacement, oxidation leads to the formation of alkanols, e.g. ethanol from the remaining alkyl groups.

The invention is directed to the deactivation of polyolefin polymers exiting a polymerization reactor train in continuous or intermittent process steps. The polymer, usually in powder or granular form, is usually contacted with $CO_2$ in a purging vessel used to purge unreacted monomer and other volatiles from the polyolefin polymer, or in a vessel or vessels downstream and generally next in line to, or adjacent, the purging vessel. The $CO_2$ reacts with aluminum alkyl species and possibly other catalyst remnants from polymerization. For maximum benefit in terms of reduced discoloration and melt flow break, it is preferable to use the $CO_2$ at a moderately low excess relative to the moles of aluminum alkyl species. Preferred ranges are molar ratios of $CO_2$ to aluminum alkyl species of from about 1 to about 10. Less preferred, but effective molar ratios of $CO_2$ to aluminum alkyl species comprise the range of from about 0.9 to about 3,000.

The $CO_2$ can be present in any form, and typically is incorporated in an inert carrier gas such as nitrogen or argon. Neat $CO_2$ may be used, however, when large excess is desired. While $CO_2$ treatment as described herein is essential to the deactivation process, product color and melt flow stability would be compromised without the admixture of a suitable acid accepting component and a secondary antioxidant. Preferably, the secondary antioxidant is selected from organic phosphites, organic phosphonites, N,N-dialkylhydroxylamines and certain lactone derivatives. Of course, if product color and melt flow stability do not pose a major concern for the particular type of polyolefin polymer produced, admixture of a suitable acid accepting component and a secondary antioxidant is optional.

The polymerization process to which the present invention is applied is a gas phase process. A number of gas phase processes are available but one such process which is illustratively and suitably used in accordance with the inventions described by Brady, et al., U.S. Pat. No. 5,317,036, and by Goeke, et al. U.S. Pat. No. 4,379,759, the disclosures of which are incorporated by reference herein in their entirety. Typically, but not exclusively, such processes, when used to make copolymers, have two reactor stages and associated downstream equipment intended for purging the product of residual monomer and other volatiles. Within the same or subsequent equipment that is used for the above-described purging, the polyolefin polymer product preferably is treated with the $CO_2$ deactivating agent.

The now "deactivated" product, while generally not fully deactivated, can be finished in various ways known in the art. Proper stabilization typically is required to complete the deactivation process, with the latter usually taking place in a melt compounding device. However, it is within the scope of the invention to deactivate and stabilize granules that are generally pellet shaped as made, and are not subsequently subjected to melt processed pelletization. Other additives can be included as needed for general stabilization and specific end-use application needs. Their inclusion can be effected by means known in the art whereby reactor granules or powder are coated or imbibed with additives, or more conventionally, additives are fed to the powder or melt stream of an extruder by continuous or incremental means using feeders, mixers, blenders, and other appropriate auxiliary equipment as necessary.

The vessel or vessels used for deactivation, and optionally also for purging, may have various sizes and shapes, but such a vessel is generally scaled to suit the production capacity of the process train in which it is an integral element. Frequently, deactivation vessels have the shape of a vertically situated cylinder with a conical bottom section. Undeactivated polymer feed is then preferably directed into the top of the cylinder by convenient means known in the art. Polymer granules progress down the vessel, driven by gravity flow, while contacting with the deactivation medium takes place. Usually the deactivation medium is added in the manner of counter current addition into the conical section at the bottom of such a deactivation bin arrangement. Such arrangements are illustrated in the previously mentioned Bernier, Brod, and Garner patents. When deactivating with $CO_2$, the gas should preferably also enter at the bottom of the deactivation vessel to ensure intimate contact with the resin. As compared to water, $CO_2$ gas could easily permeate the interstices and voids in the polymer particles throughout the vessel. This results in better contact as compared to water deactivation.

The process of the invention is not restricted to using such vertical bin arrangements, (although they are convenient and reliable). Indeed, horizontal or angular placements of deactivation vessels are within the scope of the invention. In those instances, mechanical means such as an auger may be used to drive the granules through the full extent of the vessel. It is noted for the sake of simplicity and convenience that reference is made throughout this disclosure to "deactivation vessels," but the "deactivation vessel" might in fact also be used for purging, mixing, extruding, and the like. Those skilled in the art are capable of designing a suitable deactivation vessel, and/or modifying an existing apparatus, say a purge vessel, or the like, using the guidelines provided herein.

It generally is preferred to maintain a low pressure in the deactivation vessel since the rate of gaseous monomer diffusion is higher at lower pressures. It is, however, also preferred to maintain a positive pressure in the deactivation vessel and to avoid a vacuum since any vacuum may have the effect of drawing into the system air or oxygen which would create safety problems in view of the explosive nature of the mixture of hydrocarbon monomers and oxygen. Although the proper pressure depends on many factors, those skilled in the art are capable of making that determination using known mass transfer techniques, as well as other techniques readily available in the art.

It also is preferable to provide as uniform a flow of purge and deactivator gases through the deactivation vessel as possible. To achieve this, it may be necessary to provide a plurality of uniformly spaced openings or other flow distribution devices in the bottom of the vessel for feeding the gas or gases. In one configuration, the gas is directed to the base of an inverted cone as described in Bernier, and the gas mixture, that being an inert carrier such as nitrogen and the reactive $CO_2$, flares outwardly from the base and into the deactivation vessel. It is generally desirable to feed the gaseous medium through the vessel at or above a minimum velocity for best distribution. These conditions can be established through trial and associated observation of product color and other factors that those skilled in the art may utilize.

The flow of resin through the purging and/or deactivation vessel should at least approach plug flow conditions, and various inserts or other means described in the art may be applied toward achieving that goal. The rate of flow through a deactivation vessel is not critical, with the exception that sufficient residence time is needed for the reaction with $CO_2$ to take place. Beyond that, additional time may be needed for surge purposes, and for reducing the concentration of gaseous monomers in the resin to the desired level, if the vessel is also used for purging. Generally speaking, the surge requirement is limiting, and about 2 hr of production is considered a minimum, although for purging and deactivation purposes, approximately an hour should be sufficient under most conditions, and for deactivation alone, shorter times would be associated with higher temperatures and pressures. At ambient temperatures in a deactivation vessel, residence time preferably is within the range of from about 40 minutes to about 6 hours, more preferably, from about 1 hour to about 3 hours, and most preferably about 2 hours. Of course, longer times could be used, but the time typically is limited given production concerns. Skilled artisans are capable of varying the rate of flow of $CO_2$, temperature, pressure, type of reaction vessel, and determining the appropriate residence time, using the guidelines provided herein.

The temperature within the vessel used for deactivation is not considered critical, but relates in a general way with residence time; namely, higher temperatures require less residence time to complete the deactivation process. For practical purposes, it is desirable to convey polymer powder or granules into the deactivation vessel or bin at the temperature as received from the polymerization reaction. When purging is desired, higher temperature increases the diffusion of monomers to the purging gas. Economically, it is undesirable to add further heat to the polymer powder or granules, and care must be taken not to allow temperatures in the vessel to rise to conditions whereupon the polymer softens or even melts. Again, because the inventive process does not involve steam, (although steam and/or water can be added in a subsequent deactivation vessel, or in small amounts together with $CO_2$), one need not exercise as much care when using just $CO_2$.

The present invention also contemplates deactivation within an extruder or other melt compounding device. In this embodiment, deactivation is carried out by contacting untreated reactor feed powder or granules with $CO_2$ either alone or in combination with an inert carrier gas such as nitrogen or argon. Water may also be added separately, or in this manifestation of the invention, in combination with $CO_2$ (carbonated water). Under these circumstances the rates of both reactions, $CO_2$ or water, with catalyst residue species are very fast; however, at the more moderate temperatures typical of purge vessel deactivation, the known rapid reaction with water would be expected to overwhelm that of $CO_2$, and the value added by the latter would be minimized.

The particular method of adding the appropriate deactivator ($CO_2$ and optionally water or steam) includes means known in the art for continuous or intermittent injection or otherwise addition of agents into the deactivation vessel. Skilled artisans are capable of designing suitable injection nozzles, tubes, gas lines, and the like, to add the deactivator(s) to the deactivation vessel, albeit a purge vessel, extruder, melt compounding device, or other vessel.

While the invention in general relates to deactivation, dual or multiple functionality of deactivator agent or agents is contemplated, and it is within the scope of the invention to include value added features such as devolatilization enhancement. The latter is a direct result of removal of the deactivators in a downstream vacuum zone or in multiple vacuum zones. Further, other functions such as visbreaking or crosslinking induced by prodegradants, such as organic peroxides, can be practiced in the extruder or other melt compounding device. These functions are effected by preferably adding the prodegradant to a zone beyond or downstream from the deactivation zone, since any interaction between active aluminum alkyl species and organic peroxide should be avoided due to the resulting reaction and ensuing loss of active organic peroxide. Further, in such instances devolatilization should be in a zone subsequent to the peroxide decomposition zone.

Polymers of the invention are typically made via Ziegler-Natta catalysis using either titanium or vanadium metal halide derivatives, or mixtures thereof, although single-site catalysts, and particularly metallocene catalysts, may also be used with benefits derived from $CO_2$ deactivation. The literature is rife with references to polymerization catalysts, and the present invention is useful for deactivating any known catalyst residue in a polyolefin polymer. Specific reference can be made, however, to any of U.S. Pat. Nos. 3,779,712, 3,876,602 and 3,023,203, 4,728,705, 4,771,024, 5,034,361, 5,082,907, 5,151,399, 5,229,342, 5,106,806, 5,146,028, 5,066,737, 5,077,357, 5,093,415, 5,317,036and 5,567,665, the disclosures of which are incorporated by reference herein in their entirety.

Typical catalysts useful in preparing polymers that can be treated in accordance with the present invention include, for example:

A. Ziegler-Natta catalysts, including titanium based catalysts such as those described in U.S. Pat. Nos. 4,376,062, 4,379,758, 4,728,705, 4,771,024, 5,093,415, 5,066,737 and 5,567,665. Ziegler-Natta catalysts typically include magnesium/titanium/electron donor complexes used in conjunction with an organoaluminum cocatalyst and an external selectivity control agent, such as an alkoxy silane.

B. Chromium based catalysts such as those described in U.S. Pat. Nos. 3,709,853, 3,709,954 and 4,077,904.

C. Vanadium based catalysts such as vanadium oxychloride and vanadium acetylacetonate, such as described in U.S. Pat. No. 5,317,036.

D. Cationic forms of metal halides, such as aluminum trihalides.

E. Cobalt catalysts and mixtures thereof such as those described in U.S. Pat. Nos. 4,472,559 and 4,182,814.

F. Nickel catalysts and mixtures thereof such as those described in U.S. Pat. Nos. 4,155,880 and 4,102,817.

G. Rare Earth metal catalysts, i.e., those containing a metal having an atomic number in the Periodic Table of 57 to 103, such as compounds of cerium, lanthanum, praseodymium, gadolinium and neodymium.

H. Metallocene catalysts, i.e., organometallic coordination complexes of one or more ligands in association with a metal atom. Also included are the general class of single-site catalysts.

The general class of polyolefin polymers, including thermoplastics and elastomers, may be manufactured in the gas phase process within which the instant invention is practiced. The monomers that can be used for preparing these polyolefin polymers are any olefin monomer capable of being polymerized, and preferably are those olefin monomers having from two to twelve carbon atoms, more preferably those olefin monomers having two to six carbon atoms. Preferred monomers are ethylene, propylene, butene-1, pentene-1, 4-methylpentene-1 and hexene-1. The polymers of the present invention also can include dienes, aromatic compounds with vinyl unsaturation and/or carbon monoxide. Preferred dienes are non-conjugated or conjugated diene monomers that are straight chain, branched chain or cyclic hydrocarbon dienes having from about 5 to about 15 carbon atoms. Particularly preferred dienes include 1,4-hexadiene and 5-ethylidene-2-norbornene. Preferred aromatic compounds with vinyl unsaturation that also may be polymerized include styrene and substituted styrene. Particularly preferred polymers that can be made in accordance with the present invention include ethylene homopolymers and ethylene copolymers employing one or more C3–C12 alpha olefins; propylene homopolymers and propylene copolymers employing one or more C4–C12 alpha olefins; polyisoprene; polystyrene; polybutadiene; polymers of butadiene copolymerized with styrene; polymers of butadiene copolymerized with acrylonitrile; polymers of isobutylene copolymerized with isoprene; ethylene propylene rubbers and ethylene propylene diene rubbers; polychloroprene, and the like.

Particularly preferred polyolefins are those incorporating propylene as a single or comonomer unit, with other monomer units selected from C2 to C20 alpha olefins and dienes, the latter selected from 1,4 hexadiene, 5-ethylidene-2-norbornene, 5-methylene-2-norbornene, dicyclopentadiene, 2-methyl-1,4-pentadiene and a, ω-diene monomer units. Comonomer levels may range from 0.1% w to 95% w of the total polymer, with comonomers incorporated in sequential, random, alternating or combinatory order within the polymer comprised of propylene monomer and the aforesaid comonomers. In reference to like polymeric materials, the terms copolymer and terpolymer are frequently used, although there is no intent here to limit the number of distinctly different monomer units to three in any given composition. The recognized classes of propylene polymers, including homopolymer, random and sequential or block copolymers comprise polymers of the inventive process.

The term "rubber" is generic in the context of this invention, and is typified by rubber phases such as ethylene-propylene, ethylene-butene-1, ethylene-propylene-butene-1 elastomers, but the term may also include other rubber-like phases made with Ziegler-Natta, single-site and metallocene catalysts and consisting generally of reacted mixtures of alpha-olefin monomers.

The polymerization can be conducted under polymerization conditions in a liquid phase, slurry phase or a gas-phase process employing a stirred or fluidized bed.

The reaction diluent in the liquid phase may be an inert liquid diluent or alternatively a liquid diluent which comprises the olefin, such as propylene or 1-butene, undergoing polymerization. If a copolymer is prepared wherein ethylene is one of the monomers, ethylene is introduced by conventional means. Typical polymerization conditions include a reaction temperature from about 25° C. to about 125° C. with temperatures from about 35° C. to about 90° C. being preferred and a pressure sufficient to maintain the reaction mixture in a liquid phase. Such pressures usually are from about 150 psi (1,034 Pa) to about 1200 psi (8,274 Pa), with pressures from about 250 psi (1,724 Pa) to about 900 psi (6,206 Pa) being preferred. The liquid phase reaction typically is operated in a batch-wise manner or as a continuous or semi-continuous process. Subsequent to reaction, the polymer product can be recovered by conventional procedures. The precise controls of the polymerization conditions and reaction parameters of the liquid phase process are known to persons skilled in the art.

Alternatively, the polymerization may be conducted in a gas phase process in the presence of a fluidized catalyst bed. One such gas phase process polymerization process is described in U.S. Pat. No. 4,379,759 to Goeke et al., the disclosure of which is incorporated herein by reference in its entirety. The gas phase process typically involves charging to a reactor an amount of preformed polymer particles, gaseous monomer and separately charging a lesser amount of each catalyst component. Gaseous monomer, such as propylene, can be passed through the bed of solid particles at a high rate under conditions of temperature and pressure sufficient to initiate and maintain polymerization. Unreacted olefin usually is separated and recycled. Preferably, the recycle gas is condensed to cool the reaction or a separate condensable fluid is added to the reactor. Polymerized olefin particles then can be collected at a rate substantially equivalent to the production thereof The process typically is conducted batchwise or by a continuous or semi-continuous process with constant or intermittent addition of the catalyst components and/or olefin to the polymerization reactor. Preferably the process is a continuous process. Typical polymerization temperatures for a gas phase process are from about 30° C. to about 120° C. and typical pressures are up to about 1000 psi (6,900 Pa), with pressures from about 100 psi (690 Pa) to about 500 psi (3,450 Pa) being preferred.

In both the liquid phase and the gas-phase polymerization processes, molecular hydrogen can be added to the reaction mixture as a chain transfer agent to regulate the molecular weight of the polymeric product. Hydrogen is typically employed for this purpose in a manner known to persons skilled in the art.

Beyond the inventive requirement that optimal practice of the invention requires the presence of at least one suitable acid acceptor and at least one secondary antioxidant of the afore-mentioned categories, polymers of the invention may be stabilized by means known in the art. In addition, primary antioxidants, secondary antioxidants, lubricants, acid acceptors, film anti-block and slip agents, ultraviolet (UV) stabilizers, synergists, anti-static agents, nucleating agents, clarifying agents, pigments, stabilizers, those that provide resistance to gamma irradiation, and other additives as required for product or processing needs can be added. Antioxidants include the sub-classes of primary and secondary types; examples of primary antioxidants include the phenolic-type additives typified by IRGANOX 1010, IRGANOX 3114 and ETHANOX 330. Their main function is to provide long-term thermal stability such as is often needed in fabricated articles. Secondary antioxidants (or stabilizers), in addition to those mentioned above, include those additives that contain phosphorus in either organic phosphite or organic phosphonite configurations. Examples of phosphites include IRGAFOS 168, ULTRANOX 626, ULTRANOX 627A, ULTRANOX 641, DOVERPHOS S-9228 and IRGAFOS 12. ETHANOX 398 is an exemplary fluorophosphonite. Organic phosphonite secondary antioxidants are typified by P-EPQ. Other secondary antioxidants are exemplified by lower molecular weight phenolic-types such as BHT or IRGANOX 1076, or hydroxyl amines such as distearylhydroxylamine. Secondary antioxidants function mainly by providing needed stability in melt flow and color during the melt processing of the plastic material. Another class of secondary antioxidants comprises the benzofuranone (lactone) derivatives as represented by Ciba Specialties' HP-136. Lubricants or mold release agents are typified by fatty acid amides, examples of which include N,N'-ethylenebis(stearamide), oleamide and erucamide.

Acid acceptors may be categorized as salts of fatty acids, lactic acid salts and related derivatives, hydrotalcite-like compounds, and certain metal oxides. Examples of each type in order include calcium stearate, calcium lactate, DHT-4A, and zinc, magnesium or calcium oxide. Synergists enhance the performance of primary antioxidants. Examples include the thioesters of fatty acids typified by DSTDP, DLTDP and DMTDP. Anti-static agents enhance static decay on molded parts. Key examples include glyceryl monostearate and glyceryl distearate, as well as mixtures thereof Nucleating additives are typified by benzoic acid salts such as sodium, lithium or aluminum benzoate, minerals such as talc, and organic phosphorus salts such as NA-11 and MARK 2180. Ultraviolet stabilization is provided by light absorbers such as TINUVIN 327 or by hindered amine types such as CYASORB UV 3346, TINUVIN 622, TINUVIN 770 DF and CHIMASSORB 944. Resistance against gamma irradiation is provided by combinations of additives such as phosphorous containing secondary antioxidants or the lactone type (e.g. HP-136), and hindered amines. Additionally, Milliken's RS 200 additive is of benefit, as are mobilizing additives such as mineral oil (cited in U.S. Pat. Nos. 4,110,185 and 4,274,932). The latter is used in combination with a non-phenolic secondary antioxidant and a hindered amine.

Preferred antioxidants include 1,3,5-trimethyl-2,4,6-tris (3,5-di-tert-butyl-4-hydroxy-benzyl) benzene (A); octadecyl 3-(3',5'-di'tert'butyl-4'-hydroxyphenyl) propionate (B); tetrakis[methylene (3,5-di-tert-butyl-4-hydroxyhydrocinnamate)] methane (C); tris [3,5-di-t-butyl-4-hydroxybenzyl) isocyanurate (D); 3,5-di-tert-butyl-4-hydroxyhydrocinnamic acid triester with 1,3,5-tris (2-hydroxyethyl)-s-triazine-2,4,6(1H,3H,5H)-trione (E); 1,3,5-tris-(4-tert-butyl-3-hydroxy- 2,6-dimethylbenzyl) 1,3, 5-triazine-2,4,6-(1H,3H,5H)-trione (F); bis-[3,3-bis (4'hydroxy-3'tert-butyl-phenyl)-butanoic acid]-glycolester (G); 2,2'-methylene-bis-(4-methyl-6-tertiary-butylphenol)-terephthalate (H); and 2,2 bis[4-(2-(3,5-di-tert-butyl-4-hydroxyhydrocinnamoyloxy)) ethoxy-phenyl]propane (I); calcium bis [monoethyl (3,5-di-tert-butyl-4-hydroxybenzyl) phosphonate] (J); 1,2-bis(3,5-di-tert-butyl-4-hydroxyhydrocinnamoyl)hydrazine (K); and 2,2-oxamido bis[ethyl 3-(3,5-di-tert-butyl-4-hydroxyphenyl)propionate] (L).

Additional additives may be used separately or blended with the above listed antioxidants. This applies to all of the above additive types and further includes fillers like barium sulfate, clays, calcium carbonate, silicates, pigments, such as titanium dioxide, zinc oxide, lead chromate, cadmium sulfides, cadmium selenide, zinc sulfide, basic carbonate of white lead; stabilizers such as tribasic lead sulfate, basic lead chlorosilicate, dibutyl tin oxide and other salts of lead, zinc, cadmium, tin, and the like; flame retardants such as antimony oxide; ultra-violet stabilizers, slip agents, anti-block agents, and other solid additives which enhance the properties and processability of the impact copolymer to which they are added.

While the above listing seeks to provide key examples of the different additive types, it is not to be viewed as limited by the examples in scope. It is also recognized that certain of the above additives are multi-functional, e.g., an acid acceptor such as calcium stearate may also provide mold release performance, as may also be the case with glyceryl monostearate. Further, combinations of any or all types of additives given, or of additives within a given class, are considered to be within the scope of the present invention.

Specific additives, including organic phosphite, organic phosphonite, N,N-dialkyhydroxylamine, and aromatic lactone secondary antioxidants; and metal carboxylate and hydrotalcite-like acid acceptors enhance the deactivation process in terms of reductions in melt flow break and color (determined as Yellowness Index, ASTM D 1925) measured in multi-pass extruder processing in an air environment. Particularly preferred additives in these categories include the secondary antioxidants: Irgafos 168, Irgafos 12, Ultranox 627A, Ultranox 626 Ultranox 641, Doverphos S-9228, P-EPQ, HP-136 and Fiberstab FS 042; and the hydrotalcite-like or analogous acid acceptors: DHT-4A, DHT-4AA, DHT-4C, ZHT-4A, ZHT-4D and L-55RII as well as metal fatty acid carboxylates such as calcium stearate, zinc stearate, potassium stearate, calcium lactate; aromatic carboxylates such as sodium benzoate and lithium benzoate, and metal oxides like zinc oxide, calcium oxide and magnesium oxide All additives described herein are useful by themselves, or as precursors, derivatives and thermal, oxidative or hydrolytic breakdown products thereof. Those skilled in the art are familiar with the various precursors, derivatives, and thermal, oxidative or hydrolytic breakdown products of the aforementioned additives, and are capable of using them in the invention using the guidelines provided herein.

EXAMPLES

The focus in Examples 1 and 2 is on the effects of the different deactivation modes on product properties, including in both Examples, multi-pass extrusions for melt flow and color (ASTM D 1925 Yellowness Index) and corrosivity measurements. Additionally, with Example 1 oxidation induction times, thermal analytical data and mechanical properties were collected. The testing of random copolymers in Example 2 was more selective, with the inclusion of measurements of haze, clarity and gloss on thin injection molded plaques.

Example 1

In this example, polypropylene homopolymer product was made via a magnesium chloride supported catalyst in the first reactor of a two reactor stage pilot scale fluidized bed gas phase polymerization process. Catalyst was prepared by a method similar to that described in U.S. Pat. Nos. 5,567,665, 4,771,024 and 4,728,705. Polypropylene homopolymer product was made by a method similar to that described in U.S. Pat. No. 4,379,759. Treatment with $CO_2$ or water was carried out in a purge/deactivation vessel under the conditions provided in Table 1. FIG. 1 of Bernier, U.S. Pat. No. 4,731,438, displays the vessel configuration and how the purge/deactivation gases are introduced.

TABLE 1

DEACTIVATION VESSEL CONDITIONS

| Experimental Part | Part 1 | Part 2 |
|---|---|---|
| Drum Number | 50 | 54/55 |
| Deactivation Type | Wet $N_2$ | $CO_2/N_2$ |
| Production Rate, lb/hr | 33.8 | 34.0 |
| Deactivation Volume, ft$^3$ | 2.09 | 2.09 |
| Residence Time, hr | 1.3 | 1.3 |
| Gas Flow Rate, lb/hr | 2.8 | 3.5 |
| Gas Flow/Resin Flow, lb/lb | 0.08 | 0.10 |
| Deactivation Bin Pressure, psia | 14.7 | 14.7 |
| Humidifier Temperature, ° C. | 17.6 | — |
| Water Vapor Pressure, psi | 0.29 | — |
| Water in Nitrogen, lb/lb | 0.013 | — |
| Actual Water Level in Resin, ppmw | 1,042 | — |
| $CO_2$ in $N_2$, % | — | 0.50 |
| $CO_2$ Contacting Resin, ppmw | — | 515 |
| Deactivation Bin Jacket Temperature, ° C. | 57 | 57 |
| Deactivation Bin 1 ft Temperature, ° C. | 40 | 40 |
| Deactivation Bin 3 ft Temperature, ° C. | 45 | 45 |
| Water to Triethylaluminum, molar | 50 | — |
| $CO_2$ to Triethylaluminum, molar | — | 7.5 |
| Water to Titanium, molar | 2,181 | — |
| $CO_2$ to Titanium, molar | — | 466 |

Three drums of material, one treated with water and two with $CO_2$, were collected from the deactivation vessel. Both water and $CO_2$ were added in nitrogen, with the $CO_2$ level in nitrogen being 0.5%. By estimation, the water level in resin was 1,042 ppmw and that of $CO_2$ was 515 ppmw for the pertinent treatment sample drums as shown in Table 1 The $CO_2$ to TEAL molar ratio was 7.5 and that of water to TEAL was 50. Key reactor conditions and properties of the test powders are provided in Table 2 below. It can be seen that the $CO_2$ deactivation sample had a higher melt flow (21.8 versus 18.8 dg/min). This was borne out by subsequent laboratory work wherein there was found a consistent shift of about that magnitude between the two deactivation modes.

Polypropylene powder samples from both types of deactivation were submitted for gas chromatography (GC) headspace sampling. It was found that with $CO_2$ deactivation, from about 1 to about 3% by weight of triethylaluminum (TEAL) remained unreacted, since 2–4 ppmw ethane was found in the resin powder from vial sampling. Addition of 350 ppmw of water to the sample vial did not increase the amount of ethane formed. Ethane would have resulted from moisture contacting residual alkyl groups presumably on aluminum prior to their oxidation upon air exposure.

In contrast, the water deactivated sample contained no detectable ethane because the 1,000 ppm of water apparently removed it during purging. The $CO_2$ deactivated resin also contained 25 ppmw methanol, 25 ppmw ethanol and trace amounts of other low molecular weight species by GC headspace analysis. The ethanol accounts for oxidation of only about 20% of the available aluminum alkyl groups; hence, it is possible that some fraction greater than two alkyl groups were converted to carboxyl linkages. However, while not intending to be bound by any theory, it is possible that alcohol was lost through volatilization. Whatever the actual situation, it is not critical to the invention to have an exact understanding of the underlying chemistry. Methanol may be derived from hydrolysis of the silane external electron donor; yet again, knowledge of the mechanism of its formation is of secondary importance, and does not contribute to the invention in any significant way.

TABLE 2

REACTOR CONDITIONS AND POWDER PROPERTIES

| Reactor Conditions | PART 1 | PART 2 |
|---|---|---|
| Drum Number | 50 | 54/55 |
| Polymer Type | Homopolymer | Homopolymer |
| Catalyst Type | $TiCl_4$/supported on $MgCl_2$ | $TiCl_4$/supported on $MgCl_2$ |
| Cocatalyst (TEAL) | Triethylaluminum | Triethylaluminum |
| Internal Electron Donor | Diisobutyl phthalate | Diisobutyl phthalate |
| External Electron Donor | n-propyltrimethoxysilane | n-propyltrimethoxysilane |
| Reactor Pressure, psig | 425 | 425 |
| C3 Partial Pressure, psi | 339 | 339 |
| Reactor Temperature, ° C. | 65 | 65 |
| H2/C3 Molar Ratio | 0.0302 | 0.0301 |
| Residence Time (avg), hr | 2.1 | 2.0 |
| Bed Weight, lb | 70.9 | 68.0 |
| Fluid Bulk Density, lb/ft$^3$ | 14.88 | 14.62 |
| Recycle Gas Velocity, ft/s | 0.92 | 0.90 |
| TEAL Conc., w % | 2.5 | 2.5 |
| TEAL Flow Rate, cc/hr | 160 | 190 |
| EED* Conc., w % | 0.5 | 0.5 |
| FEED Flow Rate, cc/hr | 210 | 210 |
| TEAL/EED Molar Ratio | 5.5 | 6.5 |
| Al/Ti Molar Ratio, calc. | 39.2 | 46.5 |
| EED/Ti Molar Ratio, calc. | 7.1 | 7.1 |
| Resin Properties (Pilot Plant) | | |
| Melt Flow, dg/min | 18.8 | 21.8 |
| Xylene Solubles, % w | 4.2 | — |
| Residual Ti, ppmw | 1.25 | 1.18 |
| Productivity, kg/g-Ti | 800 | 847 |
| Al/Ti Molar Ratio, lab | 45.0 | 62.0 |
| Al in PP (Lab), ppmw | 31.0 | 42.0 |
| EED in PP (calc.), ppmw | 31 | 29 |
| Settled Bulk Density, lb/ft$^3$ | 20.8 | 21.2 |

TABLE 2-continued

REACTOR CONDITIONS AND POWDER PROPERTIES

| Reactor Conditions | PART 1 | PART 2 |
|---|---|---|
| Particle Size (avg), in | 0.020 | 0.022 |
| Fines (<120 mesh), % | 4.2 | 2.5 |

*EED = External Electron Donor

Additive Formulations

The additives for formulation work were dry blended into the respective deactivation powders, drum 50 for water deactivation and blended drums 54 and 55 for $CO_2$ deactivation. The additive blending was conducted using dry mixing in nitrogen filled plastic bags. The following Table 3 summarizes the matrix of test compositions

TABLE 3

TEST COMPOSITIONS

| Sample | Deact. Mode | Drum No.* | I-1010, ppmw | I-168, ppmw | DHT-4A, ppm | Calcium Stearate, ppmw | Sodium Benzoate ppmw |
|---|---|---|---|---|---|---|---|
| A | Wet $N_2$ | 50 | 1000 | 1000 | — | — | — |
| B | $CO_2$/$N_2$ | 54/55 | 1000 | 1000 | — | — | — |
| C | Wet $N_2$ | 50 | 1000 | 1000 | 400 | — | — |
| D | $CO_2$/$N_2$ | 54/55 | 1000 | 1000 | 400 | — | — |
| E | Wet $N_2$ | 50 | 1000 | 1000 | — | 400 | — |
| F | $CO_2$/$N_2$ | 54/55 | 1000 | 1000 | — | 400 | — |
| G | Wet $N_2$ | 50 | 1000 | 1000 | — | — | 400 |
| H | $CO_2$/$N_2$ | 54/55 | 1000 | 1000 | — | — | 400 |

*The two drum combinations were blended

A specific composition such as "A" would be identified as A1 for the first extruder pass under nitrogen. Subsequent extruder passes with air would be denoted in order A2, A3 and A4.

Irganox 1010 was used as the primary antioxidant and Irgafos 168 as the secondary antioxidant (processing stabilizer). The acid acceptors were the hydrotalcite-like DHT-4A and calcium stearate. Sodium benzoate is a well known nucleating agent for polypropylene that may also serve as an acid acceptor in product formulations. The levels of use of each additive fall within normally used ranges. Logical abbreviations for additives were used in the tables.

Extrusion Conditions

All first pass (powder to pellets) extrusions were conducted under nitrogen purging on a 1¼ inch Brabender extruder equipped with a Maddock mixing section. Melt temperature for that pass was about 240° C. by hand held pyrometer. Subsequently, three passes under air were conducted at a nominal temperature of 250° C. by the same pyrometer. Pertinent conditions were recorded in Table 4.

TABLE 4

HOMOPOLYMER COMPOSITIONS, RUN CONDITIONS AND SELECTED PROPERTIES

| SAMPLE | DEACT. DRUM | DEACT. MODE | ACID ACCEPTOR | AA LEVEL, ppmw | ENVIRON | MELT T, ° C. (hand pyr.) | EXT. PASS | MF AS IS, dg/min | YELLOWNESS INDEX (YI) | YI + 1 YR |
|---|---|---|---|---|---|---|---|---|---|---|
| A1 | 50 | Wet $N_2$ | NONE | | $N_2$ | 241 | 1 | 22.5 | 3.20 | 14.41 |
| A2 | | | | | AIR | 246 | 2 | 24.5 | 9.12 | |
| A3 | | | | | AIR | | 3 | 29.8 | 13.19 | |
| A4 | | | | | AIR | | 4 | 30.5 | 16.75 | 19.36 |
| | | | | | | | | Δ8.0 | Δ13.6 | Δ5.0 |
| B1 | 54/55 (blend) | $CO_2$/$N_2$ | NONE | | $N_2$ | 237 | 1 | 24.2 | 1.11 | 13.04 |
| B2 | | | | | AIR | 241 | 2 | 26.0 | 5.06 | |
| B3 | | | | | AIR | | 3 | 31.4 | 8.31 | |
| B4 | | | | | AIR | | 4 | 33.2 | 11.44 | 15.23 |
| | | | | | | | | Δ9.0 | Δ10.3 | Δ2.2 |
| C1 | 50 | Wet $N_2$ | DHT-4A | 400 | $N_2$ | 240 | 1 | 22.3 | 0.60 | 1.77 |
| C2 | | | | | AIR | 247 | 2 | 23.7 | 6.66 | |
| C3 | | | | | AIR | | 3 | 23.4 | 10.42 | |
| C4 | | | | | AIR | | 4 | 25.2 | 12.64 | 13.19 |
| | | | | | | | | Δ2.9 | Δ12.0 | Δ11.4 |

TABLE 4-continued

HOMOPOLYMER COMPOSITIONS, RUN CONDITIONS AND SELECTED PROPERTIES

| SAMPLE | DRUM | DEACT. MODE | ACID ACCEPTOR | AA LEVEL, ppmw | ENVIRON | MELT T, °C. (hand pyr.) | EXT. PASS | MF AS IS, dg/min | YELLOW-NESS INDEX (YI) | YI + 1 YR |
|---|---|---|---|---|---|---|---|---|---|---|
| D1 | 54/55 | $CO_2/N_2$ | DHT-4A | 400 | $N_2$ | 242 | 1 | 21.7 | 0.79 | 2.17 |
| D2 | | | | | AIR | 246 | 2 | 23.5 | 5.35 | |
| D3 | | | | | AIR | | 3 | 26.1 | 8.20 | |
| D4 | | | | | AIR | | 4 | 27.7 | 10.79 | 10.96 |
| | | | | | | | | Δ6.0 | Δ10.0 | Δ8.8 |
| E1 | 50 | Wet $N_2$ | CAST | 400 | $N_2$ | 241 | 1 | 21.0 | 0.04 | 3.40 |
| E2 | | | | | AIR | 250 | 2 | 23.6 | 2.85 | |
| E3 | | | | | AIR | | 3 | 25.1 | 5.21 | |
| E4 | | | | | AIR | | 4 | 27.7 | 7.70 | 10.89 |
| | | | | | | | | Δ6.7 | Δ7.7 | Δ7.5 |
| F1 | 54/55 | $CO_2/N_2$ | CAST | 400 | $N_2$ | 240 | 1 | 22.7 | −0.48 | 4.10 |
| F2 | | | | | AIR | 247 | 2 | 24.8 | 1.50 | |
| F3 | | | | | AIR | | 3 | 26.5 | 3.36 | |
| F4 | | | | | AIR | | 4 | 29.1 | 4.79 | 10.38 |
| | | | | | | | | Δ6.4 | Δ5.3 | Δ6.3 |
| G1 | 50 | Wet $N_2$ | Na Benzoate | 400 | $N_2$ | 240 | 1 | 21.4 | −0.36 | 1.34 |
| G2 | | | | | AIR | 250 | 2 | 24.4 | 2.32 | |
| G3 | | | | | AIR | | 3 | 26.3 | 4.57 | |
| G4 | | | | | AIR | | 4 | 28.9 | 6.55 | 9.34 |
| | | | | | | | | Δ7.5 | Δ6.9 | Δ8.0 |
| H1 | 54/55 | $CO_2/N_2$ | Na Benzoate | 400 | $N_2$ | 241 | 1 | 23.0 | 0.09 | 1.66 |
| H2 | | | | | AIR | 246 | 2 | 25.3 | 2.17 | |
| H3 | | | | | AIR | | 3 | 28.6 | 3.71 | |
| H4 | | | | | AIR | | 4 | 30.2 | 5.90 | 8.99 |
| | | | | | | | | Δ7.2 | Δ5.8 | Δ7.3 |

Appropriate sampling for all testing was done, with mechanical properties obtained on the first pass, but other measured properties s generally involved multi-pass testing.

MULTI-PASS MELT FLOW RESULTS

Table 4 includes the multi-pass melt flow results. As can be seen in the above table, it is evident that, except for DHT-4A as the acid acceptor, $CO_2$ and water exhibited comparable performance in terms of reduced melt flow increase, the latter measured as the difference in melt flow (Δ melt flow) between first and fourth passes. The largest increases in melt flow were seen when there was no acid acceptor.

MULTI-PASS YELLOWNESS INDEX (YI) RESULTS

Again, Table 4 includes the test results for pellets. As seen in the table, there was a benefit of $CO_2$ deactivation with or without acid acceptor in all instances (measured as Δ YI between first and fourth passes). Only with sodium benzoate are the numbers close. Ranking of the acid acceptors in terms of yellowness was calcium stearate (best) followed by sodium benzoate and lastly, DHT-4A.

It was of interest to reexamine the tendency for discoloration after standing for a year at ambient conditions (the actual time was about 356 days). There was a generally good correlation between the initial data and the data after one year for all samples, but there were two notable outliers. These outliers corresponded to the two treatment modes without the presence of acid acceptor, and as product of the first extrusion under nitrogen; namely, samples A1 (wet $N_2$) and B1 ($CO_2/N_2$). This is an important finding, since it shows that neither deactivation mode suffices alone under normal extrusion conditions under nitrogen. An acid acceptor is present in order to maintain good pellet color over time. Again, however, if maintaining good color over time is not important, then an acid acceptor need not be present. When the two outlier points are removed, the remaining data exhibit a good linear fit of initially measured yellowness index versus yellowness index after one year. Thus in a parallel way, the benefit of improved color with $CO_2$ treatment is extended to long-term standing at ambient conditions.

THERMAL ANALYSES

Determinations were carried out for the homopolymer pelletized materials after pressing (compression molded at 20 tons on a Wabash press) into films. All measurements were made using a Perkin-Elmer 7 Series Thermal Analysis System.

Table 5 includes standard differential scanning calorimetry (DSC) measurements and final melting point (TMF) values for the above film samples. The xylene solubles content was not obtained for the drums treated with $CO_2$. Taken in entirety, the DSC results suggest a directionally higher xylene solubles content with the $CO_2$ treated material, while the TMF findings indicate that both products have and retain good isotactic backbone stereoregularity in the multi-pass melt processing study.

All runs were conducted with a Perkin-Elmer 7 Series Thermal Analysis System, with standard heating and cooling scans conducted at 10° C./min and TMF values at 1.2° C./min. For a discussion of the significance of TMF determinations using a hot stage microscopy approach, consult S. van der Ven, in the aforementioned reference, page 590.

TABLE 5

HOMOPOLYMER DIFFERENTIAL SCANNING CALORIMETRY
AND FINAL MELTING POINT (TMF) DATA

| SAMPLE | ACID ACCEPTOR | DEACT. MODE | DSC COOLING DELTA H, J/g | DSC COOLING PEAK mp, °C | DSC $2^{nd}$ HEAT DELTA H, J/g | DSC $2^{nd}$ HEAT PEAK mp, °C | TMF (1), °C | TMF (2), °C | TMF Avg. °C |
|---|---|---|---|---|---|---|---|---|---|
| A1 | None | Wet $N_2$ | −106 | 114 | 107 | 159 | 169.0 | 168.2 | 168.6 |
| A4 | | | | | | | 168.8 | 169.5 | 169.15 |
| B1 | None | $CO_2/N_2$ | −99.4 | 113 | 110 | 159 | 169.1 | 169.5 | 169.3 |
| B4 | | | | | | | 168.2 | 168.4 | 168.3 |
| C1 | DHT-4A | Wet $N_2$ | −102 | 114 | 108 | 160 | 168.4 | 168.7 | 168.55 |
| C4 | | | | | | | 168.3 | 168.9 | 168.6 |
| D1 | DHT-4A | $CO_2/N_2$ | −98.7 | 112 | 102 | 159 | 168.7 | 169.2 | 168.95 |
| D4 | | | | | | | 168.9 | 168.3 | 168.6 |
| E1 | CaSt | Wet $N_2$ | −100 | 114 | 106 | 160 | 169.4 | 169.6 | 169.5 |
| E4 | | | | | | | 168.5 | 169.4 | 168.95 |
| F1 | CaSt | $CO_2/N_2$ | −96.5 | 112 | 99.7 | 159 | 169.4 | 169.4 | 169.4 |
| F4 | | | | | | | 168.4 | 170.0 | 169.2 |

MECHANICAL PROPERTIES

Mechanical properties were obtained on injection molded specimens of the first pass (under nitrogen) samples. Results are provided in Table 6. The data are for specimens that were aged a minimum of two weeks prior to testing. No notable differences relatable to deactivation mode were seen. As seen with the DSC results, the material deactivated with $CO_2$ is generally slightly lower in stiffness properties (1% secant modulus and tensile yield strength). This suggests a higher xylene solubles level A reference material, 5C13 Lot. No. 9NSE420, was a standard nominally 12 dg/min polypropylene homopolymer that was not deactivated with $CO_2$. Its purpose was to monitor test equipment reliability.

CORROSIVITY RESULTS

All of the homopolymer test materials, including all extruder passes, gave the highest (best) corrosivity rating (A) in the Steel Plate Exposure Method for polypropylene. In the latter test, mild steel disks (polished to approximately No. 8 RMS finish) of dimensions: 1.5 inch diameter; 0.125 inch in thickness, are maintained at a temperature of 18° C. while suspended 0.5 inch above 30 g of polymer melt held at 500° F. within a glass sample cup. Heating is maintained for 1.5 hour after sample charging. After rinsing with an acetone soaked cloth or tissue, the surface of the disk is examined for etching and pitting using 140× magnification. Comparison is made with reference photomicrographs upon which the rating scale A (no visible corrosion) to F (very badly corroded) is made. Ratings of C (mild corrosion visible to the naked eye) are considered marginal. Plus or minus values are assigned to ratings as appropriate where the deviation is toward less (+) or more (−) corrosion.

Example 2

In this example, random copolymer products were prepared. The test materials were prepared as in Example 1 via substantially similar catalyst components and co-ingredients. The catalyst was prepared by a method similar to that disclose in U.S. Pat. No. 5,093,415. The

TABLE 6

HOMOPOLYMER MECHANICAL PROPERTIES DATA

| SAMPLE | ACID ACCEPTOR | DEACT. MODE | 1% SECANT FLEX. MOD., psi, 0.05 in/min | TENSILE YIELD ST., psi, 2 in/min | TENSILE YIELD EL., %, 2 in/min | NOTCHED IZOD, 23° C., ft-lb/in |
|---|---|---|---|---|---|---|
| Reference | — | — | 228,178 | 5156 | 6.77 | 0.61 |
| A1 | None | Wet $N_2$ | 224,481 | 5251 | 6.79 | 0.52 |
| B1 | None | $CO_2/N_2$ | 225,438 | 5261 | 6.83 | 0.52 |
| C1 | DHT-4A | Wet $N_2$ | 229,286 | 5245 | 6.59 | 0.56 |
| D1 | DHT-4A | $CO_2/N_2$ | 225,036 | 5263 | 6.85 | 0.53 |
| E1 | Calcium Stearate | Wet $N_2$ | 226,420 | 5266 | 6.68 | 0.52 |
| F1 | Calcium Stearate | $CO_2/N_2$ | 221,309 | 5248 | 7.00 | 0.53 |
| G1 | Sodium Benzoate | Wet $N_2$ | 249,276 | 5610 | 6.28 | 0.51 |
| H1 | Sodium Benzoate | $CO_2/N_2$ | 248,800 | 5558 | 6.33 | 0.52 | products were copolymers of propylene and ethylene containing 4% w of ethylene incorporation. Three powder treatments were used. They included: dry nitrogen, wet nitrogen, and $CO_2$ not diluted by nitrogen. Drum quantities for each class of deactivation were obtained. Deactivation bin conditions were essentially the same as in Example 1 with the exception that a large excess of $CO_2$ (without nitrogen) was used this time. Table 7 includes a summary of conditions. The properties of the test powders are given in Table 8.

TABLE 7

DEACTIVATION BIN CONDITIONS

| Experimental Part | 2a | 2b | 2c |
|---|---|---|---|
| Drum Number | 77 | 81 | 83 |
| Deactivation Type | Dry $N_2$ | Wet $N_2$ | $CO_2$ |
| Production Rate, lb/hr | 36 | 30 | 30 |
| Deactivation Volume, ft$^3$ | 2.09 | 2.09 | 2.09 |
| Residence Time, hr | 1.2 | 1.5 | 1.5 |
| Gas Flow Rate, lb/hr | 3.5 | 3.5 | 2.3 |
| Gas Flow/Resin Flow, lb/lb | 0.10 | 0.12 | 0.08 |
| Deactivation Bin Pressure, psia | 14.7 | 14.7 | 14.7 |
| Humidifier Temperature, ° C. | — | 29 | — |
| Water Vapor Pressure, psi | — | 0.57 | — |
| Water in Nitrogen, lb/lb | — | 0.025 | — |
| Actual Water Level in Resin, ppmw | 0 | 2,963 | — |
| $CO_2$ in $N_2$, % | — | — | No $N_2$ |
| $CO_2$ Contacting Resin, ppmw | 0 | 0 | 76,667 |
| Deactivation Bin Jacket Temperature, ° C. | 67 | 71 | 72 |
| Deactivation Bin 1 ft Temperature, ° C. | 33 | 34 | 35 |
| Deactivation Bin 3 ft Temperature, ° C. | 40 | 45 | 47 |
| Water to Triethylaluminum, molar | — | 206 | — |
| $CO_2$ to Triethylaluminum, molar | — | — | 2,189 |
| Water to Titanium, molar | — | NA | — |
| $CO_2$ to Titanium, molar | — | — | 3,849 |

TABLE 8

REACTOR CONDITIONS AND POWDER PROPERTIES

| Reactor Conditions | 2a | 2b | 2c |
|---|---|---|---|
| Drum Number | 77 | 81 | 83 |
| Polymer Type | Random | Random | Random |
| Catalyst Type | Ex. 1 | Ex. 1. | Ex. 1 |
| Cocatalyst (TEAL) | Ex. 1 | Ex. 1 | Ex. 1 |
| Internal Electron Donor | Ex. 1 | Ex. 1 | Ex. 1 |
| External Electron Donor | Ex. 1 | Ex. 1 | Ex. 1 |
| Reactor Pressure, psig | 426 | 427 | 427 |
| C3 Partial Pressure, psig | 319 | 320 | 323 |
| Reactor Temperature, ° C. | 60 | 60 | 60 |
| H2/C3 Molar Ratio | 0.02703 | 0.02700 | 0.02666 |
| C2/C3 Molar Ratio | 0.01569 | 0.0164 | 0.01619 |
| Residence Time (avg), hr | 2.1 | 2.5 | 2.5 |
| Bed Weight, lb | 76 | 75 | 75 |
| Fluid Bulk Density, lb/ft$^3$ | 11.7 | 11.9 | 11.0 |
| Recycle Gas Velocity, ft/s | 1.39 | 1.38 | 1.36 |
| TEAL Conc., w % | 5.00 | 5.00 | 5.00 |
| TEAL Flow Rate, cc/hr | 131 | 127 | 129 |
| External Electron Donor Conc., w % | 1.0 | 1.0 | 1.0 |
| External Electron Donor Flow Rate, cc/hr | 152 | 156 | 153 |
| TEAL/External Electron Donor Molar Ratio | 6.2 | 8.6 | 6.1 |
| Al/Ti Molar Ratio, lab | 259 | 132 | 119 |
| External Electron Donor/Ti Molar Ratio, calc. | 28.2 | 15.3 | 27.7 |
| Resin Properties (Pilot Plant) | | | |
| Melt Flow, dg/min | 9.2 | 10.7 | 9.6 |
| Ethylene Incorp., % w | 4.0 | 4.0 | 4.1 |
| Xylene Solubles, % w | 8 | 8 | 8 |
| Residual Ti, ppmw | 0.61 | | 0.78 |
| Productivity, kg/g-Ti | 1638 | | 1280 |
| Al in PP (lab), ppmw | 90 | | 52 |
| Al in PP (calc.) ppmw | 63 | 73 | 74 |
| External Electron Donor in PP (calc.), ppmw | 62 | 76 | 74 |
| Settled Bulk Den., lb/ft$^3$ | 19.7 | 21.6 | 21.5 |
| Particle Size (avg), in | 0.028 | | 0.025 |
| Fines (<120 mesh), % | 8.8 | | 9.6 |

The following Tables 9a and 9b summarize the matrix of test compositions:

TABLE 9a

TEST COMPOSITIONS

| Sample | Deact. Mode | Drum Nos.* | I-1010, ppmw | I-168, ppmw | U-627A, ppmw | DHT-4A, ppmw | CaSt, ppmw |
|---|---|---|---|---|---|---|---|
| A | Dry $N_2$ | 77 | 1000 | 1000 | — | — | — |
| C | Wet $N_2$ | 80/81 | 1000 | 1000 | — | — | — |
| D | $CO_2$ | 82/83 | 1000 | 1000 | — | — | — |
| E | Dry $N_2$ | 77 | 1000 | 1000 | — | 400 | — |
| G | Wet $N_2$ | 80/81 | 1000 | 1000 | — | 400 | — |
| H | $CO_2$ | 82/83 | 1000 | 1000 | — | 400 | — |
| I | Wet $N_2$ | 80/81 | 1000 | — | 1000 | 400 | — |
| J | $CO_2$ | 82/83 | 1000 | — | 1000 | 400 | — |
| K | Dry $N_2$ | 77 | 1000 | 1000 | — | — | 400 |
| M | Wet $N_2$ | 80/81 | 1000 | 1000 | — | — | 400 |
| N | $CO_2$ | 82/83 | 1000 | 1000 | — | — | 400 |
| O | Wet $N_2$ | 80/81 | 1000 | — | 1000 | — | 400 |
| P | $CO_2$ | 82/83 | 1000 | — | 1000 | — | 400 |

TABLE 9b

| Sample | Deact. Mode | Drum Nos.* | I-3114 | P-EPQ | U-627A | DHT-4A | CaSt | Millad 3988 | Myverol 18-06 | Acrawax C |
|---|---|---|---|---|---|---|---|---|---|---|
| Q | Wet $N_2$ | 80/81 | 500 | 800 | — | 200 | 500 | 2000 | 400 | 1500 |
| R | $CO_2$ | 82/83 | 500 | 800 | — | 200 | 500 | 2000 | 400 | 1500 |
| S | Wet $N_2$ | 80/81 | 500 | — | 800 | 200 | 500 | 2000 | 400 | 1500 |
| T | $CO_2$ | 82/83 | 500 | — | 800 | 200 | 500 | 2000 | 400 | 1500 |

*The two drum combinations were blended.

As with the homopolymer samples of Example 1, a specific composition such as "A" would be identified as A1 for the first extruder pass under nitrogen. Subsequent extruder passes with air would be denoted in order A2, A3 and A4.

Also, the same acid acceptors and primary and secondary antioxidants were used. In addition, another phosphite, Ultranox 627A, and a phosphonite, P-EPQ were included. Furthermore, formulations Q, R, S, and T were clarified random copolymers, where Milliken's Millad 3988 was used as the clarifying additive, Acrawax C (N,N'-ethylenebis (stearamide)) and Myverol 18-06 (glyceryl monostearate) were used as mold release/anti-static agents, and Irganox 3114 was the primary antioxidant. Conventional and logical abbreviations for additives were used in the tables.

EXTRUSION CONDITIONS

All first pass extrusions (powder to pellets) were conducted under nitrogen purging on a 1¼ inch Brabender extruder equipped with a Maddock mixing section. Melt temperature for that pass was about 250° C. by hand held pyrometer. Subsequently, three passes under air were conducted at a nominal temperature of 270° C. by the same pyrometer. Pertinent conditions were recorded in Table 10 (A and B).

TABLE 10A

RANDOM COPOLYMERS

| ID | DRUM | DEACT. MODE | ACID AC. | I-1010, ppmw | I-168, ppmw | U-627A, ppmw | DHT-4A, ppmw | CAST ppmw | ENV | MELT T ° C. | MF As Is dg/min | YI initial | YI + 6 months |
|---|---|---|---|---|---|---|---|---|---|---|---|---|---|
| A1 | 77 | Dry N$_2$ | NONE | 1000 | 1000 | | | | N$_2$ | 250 | 10.3 | 2.89 | 7.97 |
| A2 | | | | | | | | | AIR | 271 | 11.7 | 6.67 | |
| A3 | | | | | | | | | AIR | 269 | 13.4 | 10.10 | |
| A4 | | | | | | | | | AIR | 268 | 16.0 | 12.67 | 16.44 |
| | | | | | | | | | | | Δ5.7 | Δ9.8 | Δ8.5 |
| C1 | 80/81 | Wet N$_2$ | NONE | 1000 | 1000 | | | | N$_2$ | 259 | 10.0 | 0.62 | 3.25 |
| C2 | | | | | | | | | AIR | 284 | 11.6 | 2.97 | |
| C3 | | | | | | | | | AIR | 282 | 13.3 | 6.94 | |
| C4 | | | | | | | | | AIR | 282 | 15.0 | 10.39 | 13.74 |
| | | | | | | | | | | | Δ5.0 | Δ9.8 | Δ10.5 |
| D1 | 82/83 | CO$_2$ | NONE | 1000 | 1000 | | | | N$_2$ | 249 | 9.8 | 1.14 | 4.72 |
| D2 | | | | | | | | | AIR | 273 | 11.4 | 3.98 | |
| D3 | | | | | | | | | AIR | 269 | 13.0 | 6.87 | |
| D4 | | | | | | | | | AIR | 271 | 15.4 | 6.94 | 12.11 |
| | | | | | | | | | | | Δ5.6 | Δ5.8 | Δ7.4 |
| E1 | 77 | Dry N$_2$ | YES | 1000 | 1000 | | 400 | | N$_2$ | 247 | 9.9 | 2.09 | 2.72 |
| E2 | | | | | | | | | AIR | 271 | 11.7 | 5.64 | |
| E3 | | | | | | | | | AIR | 269 | 13.7 | 7.17 | |
| E4 | | | | | | | | | AIR | 273 | 15.8 | 8.09 | 8.8 |
| | | | | | | | | | | | Δ5.9 | Δ6.0 | Δ6.1 |
| G1 | 80/81 | Wet N$_2$ | YES | 1000 | 1000 | | 400 | | N$_2$ | 249 | 9.8 | 0.44 | 1.18 |
| G2 | | | | | | | | | AIR | 271 | 11.3 | 2.34 | |
| G3 | | | | | | | | | AIR | 269 | 13.2 | 4.15 | |
| G4 | | | | | | | | | AIR | 270 | 15.0 | 5.53 | 6.55 |
| | | | | | | | | | | | Δ5.2 | Δ5.1 | Δ5.4 |
| H1 | 82/83 | CO$_2$ | YES | 1000 | 1000 | | 400 | | N$_2$ | 249 | 9.7 | 0.68 | 1.16 |
| H2 | | | | | | | | | AIR | 271 | 11.3 | 3.40 | |
| H3 | | | | | | | | | AIR | 269 | 13.1 | 5.66 | |
| H4 | | | | | | | | | AIR | 270 | 14.9 | 6.97 | 7.7 |
| | | | | | | | | | | | Δ5.2 | Δ6.3 | Δ6.5 |
| I1 | 80/81 | Wet N$_2$ | YES | 1000 | | 1000 | 400 | | N$_2$ | 250 | 9.8 | −0.04 | 0.51 |
| I2 | | | | | | | | | AIR | 270 | 10.5 | 0.37 | |
| I3 | | | | | | | | | AIR | 270 | 11.4 | 0.96 | |
| I4 | | | | | | | | | AIR | 270 | 12.3 | 1.93 | 2.44 |
| | | | | | | | | | | | Δ2.5 | Δ2.0 | Δ1.9 |
| J1 | 82/83 | CO$_2$ | YES | 1000 | | 1000 | 400 | | N$_2$ | 249 | 9.6 | 0.34 | 0.68 |
| J2 | | | | | | | | | AIR | 270 | 10.5 | 1.05 | |
| J3 | | | | | | | | | AIR | 270 | 11.2 | 1.73 | |
| J4 | | | | | | | | | AIR | 270 | 12.1 | 2.71 | 2.89 |
| | | | | | | | | | | | Δ2.5 | Δ2.4 | Δ2.2 |
| K1 | 77 | Dry N$_2$ | YES | 1000 | 1000 | | | 400 | N$_2$ | 248 | 10.2 | 0.05 | 2.48 |
| K2 | | | | | | | | | AIR | 271 | 12.1 | 2.49 | |
| K3 | | | | | | | | | AIR | 270 | 13.5 | 4.71 | |
| K4 | | | | | | | | | AIR | 270 | 16.2 | 5.89 | 12.09 |
| | | | | | | | | | | | Δ6.0 | Δ5.8 | Δ9.6 |
| M1 | 80/81 | Wet N$_2$ | YES | 1000 | 1000 | | | 400 | N$_2$ | 248 | 9.8 | −0.68 | 1.1 |
| M2 | | | | | | | | | AIR | 270 | 11.4 | 0.44 | |
| M3 | | | | | | | | | AIR | 274 | 12.7 | 1.92 | |
| M4 | | | | | | | | | AIR | 269 | 14.4 | 3.42 | 6.5 |
| | | | | | | | | | | | Δ4.6 | Δ4.1 | Δ5.4 |
| N1 | 82/83 | CO$_2$ | YES | 1000 | 1000 | | | 400 | N$_2$ | 249 | 10.1 | −0.34 | 1.39 |
| N2 | | | | | | | | | AIR | 271 | 11.4 | 1.17 | |
| N3 | | | | | | | | | AIR | 269 | 13.3 | 2.56 | |
| N4 | | | | | | | | | AIR | 270 | 15.4 | 4.29 | 7.37 |
| | | | | | | | | | | | Δ5.3 | Δ4.6 | Δ6.0 |
| O1 | 80/81 | Wet N$_2$ | YES | 1000 | | 1000 | | 400 | N$_2$ | 248 | 9.7 | −0.43 | 0.13 |

TABLE 10A-continued

RANDOM COPOLYMERS

| ID | DRUM | DEACT. MODE | ACID AC. | I-1010, ppmw | I-168, ppmw | U-627A, ppmw | DHT-4A, ppmw | CAST ppmw | ENV | MELT T °C. | MF As Is dg/min | YI initial | YI + 6 months |
|---|---|---|---|---|---|---|---|---|---|---|---|---|---|
| O2 | | | | | | | | | AIR | 272 | 10.3 | 0.04 | |
| O3 | | | | | | | | | AIR | 271 | 11.0 | 0.88 | |
| O4 | | | | | | | | | AIR | 270 | 11.8 | 2.08 | 2.88 |
| | | | | | | | | | | | Δ2.1 | Δ2.5 | Δ2.8 |
| P1 | 82/83 | $CO_2$ | YES | 1000 | | 1000 | | 400 | $N_2$ | 249 | 9.7 | −0.81 | −0.11 |
| P2 | | | | | | | | | AIR | 272 | 10.3 | −0.24 | |
| P3 | | | | | | | | | AIR | 272 | 11.0 | 1.27 | |
| P4 | | | | | | | | | AIR | 269 | 11.7 | 1.71 | 3.36 |
| | | | | | | | | | | | Δ2.0 | Δ2.5 | Δ3.5 |

TABLE 10B

CLARIFIED FORMULATIONS

| ID | DRUM | DEACT. MODE | ACID AC. | U-627A ppmw | DHT-4A ppmw | CAST ppmw | I-3114 ppmw | P-EPQ ppmw | ML 3988 ppmw | M 18-06 ppmw | ACWX ppmw | ENV | MELT T, °C. | MF As Is, dg/min | YI INIT | YI + 6 Mos |
|---|---|---|---|---|---|---|---|---|---|---|---|---|---|---|---|---|
| Q1 | 80/81 | WET $N_2$ | YES | | 200 | 500 | 500 | 800 | 2000 | 400 | 1500 | $N_2$ | 248 | 10.3 | −0.49 | 0.16 |
| Q2 | | | | | | | | | | | | AIR | 272 | 11.2 | 0.72 | |
| Q3 | | | | | | | | | | | | AIR | 273 | 11.9 | 2.96 | |
| Q4 | | | | | | | | | | | | AIR | 271 | 12.5 | 3.96 | 4.32 |
| | | | | | | | | | | | | | | Δ2.2 | Δ4.5 | Δ4.2 |
| R1 | 82/83 | $CO_2$ | YES | | 200 | 500 | 500 | 800 | 2000 | 400 | 1500 | $N_2$ | 248 | 10.0 | −0.74 | −0.21 |
| R2 | | | | | | | | | | | | AIR | 273 | 10.9 | 0.83 | |
| R3 | | | | | | | | | | | | AIR | 272 | 12.1 | 2.11 | |
| R4 | | | | | | | | | | | | AIR | 271 | 13.7 | 3.83 | 5.09 |
| | | | | | | | | | | | | | | Δ3.7 | Δ4.6 | Δ5.3 |
| S1 | 80/81 | WET $N_2$ | YES | 800 | 200 | 500 | 500 | | 2000 | 400 | 1500 | $N_2$ | 247 | 10.3 | 0.20 | 0.76 |
| S2 | | | | | | | | | | | | AIR | 272 | 11.2 | 1.75 | |
| S3 | | | | | | | | | | | | AIR | 271 | 11.8 | 4.79 | |
| S4 | | | | | | | | | | | | AIR | 274 | 13.1 | 5.89 | 6.73 |
| | | | | | | | | | | | | | | Δ2.8 | Δ5.69 | Δ5.97 |
| T1 | 82/83 | $CO_2$ | YES | 800 | 200 | 500 | 500 | | 2000 | 400 | 1500 | $N_2$ | 249 | 10.4 | −0.01 | 0.05 |
| T2 | | | | | | | | | | | | AIR | 269 | 11.3 | 2.46 | |
| T3 | | | | | | | | | | | | AIR | 271 | 12.2 | 5.33 | |
| T4 | | | | | | | | | | | | AIR | 271 | 13.0 | 7.36 | 7.02 |
| | | | | | | | | | | | | | | Δ2.6 | Δ7.37 | Δ6.97 |

Appropriate sampling for all testing was done. No mechanical or thermal properties were obtained for these materials.

MULTI-PASS MELT FLOW RESULTS

Table 10 (A and B) includes the multi-pass melt flow results. As can be seen from these tables, in the absence of acid acceptor, a significant increase in melt flow is observed over the four extruder passes regardless of the deactivation treatment mode (nothing, water or $CO_2$). Little advantage is seen for DHT-4A with the 1-168/I-1010 package. When I-168 is replaced by Ultranox 627A, significant improvement occurs, with comparable performance by both water in nitrogen and neat $CO_2$. With calcium stearate, water deactivation was directionally best, although there was still a notable amount of melt flow break. Again, with replacement of I-168 by Ultranox 627A, good performance was evident. The clarified formulations (Q, R, S, T) exhibited moderately good performance overall, with wet nitrogen and use of P-EPQ (formulation Q) being directionally best.

The afore-mentioned tables suggest that, on the whole, the selection of water or $CO_2$ was not the primary factor in achieving the results therein, and dry $N_2$ treatment was almost as good as either water or $CO_2$. The selection of phosphorous containing secondary antioxidant, however, was found to be a key factor regarding reducing melt flow break. More specifically, Ultranox 627A and P-EPQ were better than I-168.

MULTI-PASS YELLOWNESS INDEX RESULTS

Table 10 (A and B) also includes the test results. As can be seen from the table, without acid acceptor, deactivation with neat $CO_2$ produces remarkably low color comparable to other formulations using I-168 as the secondary antioxidant. With DHT-4A as the acid acceptor, the wet nitrogen mode was directionally best. This was repeated with calcium stearate, but a reversal with neat $CO_2$ better (in the last pass) was seen with replacement of 1-168 by Ultranox 627A. With the clarified formulations, Ultranox 627A (S, T) was not as good as P-EPQ (Q, R), and with the latter, performance of neat $CO_2$ and wet nitrogen were equivalent.

The results are mixed, with both water in the deactivation bin and neat $CO_2$ producing low color samples. These results show that neat $CO_2$ improves color relative to no deactivation treatment (dry $N_2$) by the final pass color measurement, and generally also by the amount of color increase (Δ YI). Again, the selection of acid acceptor and secondary antioxidant played a role in these results.

A comparison of color between initial and aged samples also was conducted. The samples, including all multi-pass materials, were re-measured after six months (the actual elapsed time ranged from 2 to 6 days longer than 6 months, depending on the measurement day). A good linear correlation was found. By visual inspection, it was found that there is a marked similarity between the relationships for random copolymers and that for homopolymers (Example 1). The major difference that can be seen is the two-fold longer elapsed time for the homopolymer samples. Accordingly, to a first approximation, the rate of color production in random copolymer is about twice that of homopolymer under the conditions of these examples.

HAZE, GLOSS AND CLARITY

Table 11 includes the results of haze, gloss and clarity tests (first and fourth passes) as measured on 45 mil thick 4 inch×4 inch injection molded plaques. These tests were conducted in accordance with ASTM D 523/D 2457 for gloss at 60 degrees; ASTM D 1003 for Haze, and ASTM D 1746 for Clarity. Examination of the results reveals relatively close performance among the various materials. Consistent trends for increased haze and reduced clarity with reprocessing are seen. A small bias in favor of wet $N_2$ treatment was evident with the clarity measurements, but the performance of all formulations tested was viewed as being very good. In Table 11, the reference was NRD60492 Lot 08URZ403, a random propylene-ethylene copolymer having nominal melt flow and ethylene content values of 12 dg/min and 4% w respectively. Its purpose was to monitor test equipment reliability.

and at least one secondary antioxidant. Because the deactivation with $CO_2$ is preferably conducted without water or steam, particle agglomeration and polymer stickiness can be avoided. Moreover, deactivation with $CO_2$ provides polymers with generally better color (less yellowness) having comparable mechanical and optical properties to deactivation with water or steam.

While the invention has been described in detail with reference to particularly preferred embodiments, those skilled in the art will appreciate that various modifications can be made to the invention without departing significantly from the spirit and scope thereof. All documents described above are incorporated by reference herein in their entirety.

What is claimed is:

1. A method of deactivating catalyst residue in a polyolefin polymer comprising:
   a) contacting the polyolefin polymer with $CO_2$ in a post-reactor vessel to form a deactivated polyolefin polymer; and
   b) incorporating into the deactivated polyolefin polymer an acid acceptor and at least one secondary antioxidant.

2. The method as claimed in claim 1, wherein the polyolefin polymer is a propylene homopolymer or copolymer.

3. The method as claimed in claim 1, wherein at least one acid acceptor is selected from the group consisting of metal salts of fatty acids, lactic acid metal salts and related derivatives; hydrotalcite-like compounds, zinc containing analogues and metal oxides.

4. The method as claimed in claim 1, wherein the at least one secondary antioxidant is selected from Me- group consisting of organic phosphites, organic phosphonites, aromatic lactones, N,N-dialkylhydroxylamines and precursors,

TABLE 11

CLARIFIED RANDOM COPOLYMER HAZE, GLOSS AND CLARITY DATA

| SAMPLE | ACID ACCEPTOR | DEACT. MODE | SECONDARY ANTIOX. | HAZE, % | GLOSS 60 degrees | CLARITY, % |
| --- | --- | --- | --- | --- | --- | --- |
| Reference |  |  |  | 10.5 | 139.3 | 74.0 |
| Q1 | DHT-4A; CaSt | Wet $N_2$ | P-EPQ | 10.8 | 133.8 | 73.0 |
| Q4 |  |  |  | 12.1 | 133.2 | 67.7 |
| R1 | DHT-4A; CaSt | $CO_2$ | P-EPQ | 10.9 | 133.2 | 72.6 |
| R4 |  |  |  | 11.6 | 134.5 | 64.5 |
| S1 | DHT-4A; CaSt | Wet $N_2$ | U-627A | 11.0 | 133.1 | 72.5 |
| S4 |  |  |  | 11.7 | 134.4 | 65.9 |
| T1 | DHT-4A; CaSt | $CO_2$ | U-627A | 10.6 | 132.7 | 72.8 |
| T4 |  |  |  | 12.7 | 131.6 | 64.1 |

CORROSIVITY RESULTS

Similar to the homopolymer materials, the random copolymer samples (fourth extruder pass) gave excellent ratings of A for all except one sample, with the lowest value being A−.

The Examples above show that deactivation of catalyst residue in polyolefin polymer products can be effected by contacting the polymer with $CO_2$ after the polymer is formed in the polymerization reactor, and then subsequently melt extruding or otherwise incorporating an acid acceptor derivatives and thermal, oxidative or hydrolytic breakdown products thereof 5. The method as claimed in claim 1, wherein the polyolefin polymer product is produced in at least one gas phase reactor.

6. The method as claimed in claim 3, wherein the metal oxide is selected from the group consisting of zinc oxide, magnesium oxide and calcium oxide.

* * * * *